(12) United States Patent  (10) Patent No.: US 8,260,679 B2
Smith et al.  (45) Date of Patent: Sep. 4, 2012

(54) SYSTEM AND METHOD OF EVENT TRIGGERED VOICE CALL ORIGINATION

(75) Inventors: Charles Eric Smith, Austin, TX (US); Chris Tooley, Blanco, TX (US); Lanny Wayne Walker, Austin, TX (US); James Edward Butcher, Round Rock, TX (US); Roy Stacey Zuniga, Austin, TX (US)

(73) Assignee: Unwired Nation, Inc., Austin, TX (US)

( * ) Notice: Subject to any disclaimer, the term of this patent is extended or adjusted under 35 U.S.C. 154(b) by 1590 days.

(21) Appl. No.: 11/216,584

(22) Filed: Aug. 31, 2005

(65) Prior Publication Data

US 2007/0050304 A1  Mar. 1, 2007

(51) Int. Cl.
  *G06Q 30/00*  (2006.01)
(52) U.S. Cl. ........................ 705/26.3; 705/37; 379/93.12
(58) Field of Classification Search .................... 705/26, 705/27, 26.3, 37
  See application file for complete search history.

(56) References Cited

U.S. PATENT DOCUMENTS

| | | | |
|---|---|---|---|
| 6,510,417 B1 | 1/2003 | Woods et al. | |
| 6,658,093 B1 | 12/2003 | Langseth et al. | |
| 6,768,788 B1 | 7/2004 | Langseth et al. | |
| 6,850,252 B1 * | 2/2005 | Hoffberg | 715/716 |
| 6,901,430 B1 | 5/2005 | Smith | |
| 7,013,155 B1 | 3/2006 | Ruf et al. | |
| 7,062,462 B1 | 6/2006 | Ireland et al. | |
| 7,151,438 B1 * | 12/2006 | Hall et al. | 340/286.06 |
| 7,197,461 B1 * | 3/2007 | Eberle et al. | 704/275 |
| 7,299,206 B2 | 11/2007 | Taylor et al. | |
| 2002/0010636 A1 | 1/2002 | Immel | |
| 2002/0032631 A1 | 3/2002 | Rose | |
| 2002/0062276 A1 * | 5/2002 | Krueger et al. | 705/37 |
| 2002/0065885 A1 | 5/2002 | Buonanno et al. | |
| 2002/0069244 A1 | 6/2002 | Blair et al. | |
| 2002/0073158 A1 | 6/2002 | Dalal et al. | |
| 2002/0092903 A1 | 7/2002 | Matsumoto | |
| 2002/0099776 A1 | 7/2002 | Cafarella et al. | |
| 2003/0055771 A1 | 3/2003 | RuDusky | |
| 2003/0101116 A1 | 5/2003 | Rosko et al. | |
| 2003/0133546 A1 * | 7/2003 | Meyer | 379/93.12 |
| 2003/0154120 A1 | 8/2003 | Freishtat et al. | |
| 2004/0054551 A1 | 3/2004 | Ausubel et al. | |
| 2004/0172454 A1 | 9/2004 | Appelman et al. | |
| 2005/0004984 A1 | 1/2005 | Simpson | |
| 2005/0033734 A1 | 2/2005 | Chess et al. | |
| 2005/0043860 A1 * | 2/2005 | Petite | 700/291 |
| 2005/0097000 A1 | 5/2005 | Freishtat et al. | |
| 2005/0108109 A1 | 5/2005 | Wittsche | |
| 2005/0171838 A1 * | 8/2005 | Eglinton | 705/14 |
| 2005/0182707 A1 * | 8/2005 | Yeager | 705/37 |
| 2006/0047572 A1 * | 3/2006 | Moore et al. | 705/14 |
| 2006/0173770 A1 * | 8/2006 | McKay et al. | 705/37 |
| 2007/0011050 A1 * | 1/2007 | Klopf et al. | 705/14 |
| 2007/0174171 A1 * | 7/2007 | Sheffield | 705/37 |

OTHER PUBLICATIONS

Lopez, Ed, "Inside messaging: Content services stir carriers", Wireless Week, dated Nov. 29, 1999.*

(Continued)

*Primary Examiner* — Mark Fadok
(74) *Attorney, Agent, or Firm* — Toler Law Group, PC

(57) ABSTRACT

A method of selective call initiation is disclosed and includes receiving data from a computer based auction site. Further, the method includes detecting a notification event by evaluating the data with respect to notification criteria associated with a user account. Also, the method includes initiating a voice based call over a voice network to a communication device identified in connection with the user account. A system is also disclosed and includes a first processing element that is coupled to a network interface to receive data from a computer based auction site. Also, the system includes a second processing element to detect a notification event by evaluating the data with respect to notification criteria associated with a user account. Moreover, the system includes a third processing element to initiate an outgoing voice based call over a voice network to a communication device identified in connection with the user account.

70 Claims, 5 Drawing Sheets

OTHER PUBLICATIONS

Tellme Networks, Inc, Hoovers summary of Tellme.com, dated 2012.*
PR Newswire, "e-pager Makes National Debut for Holidays as PageMart Wireless Combines Paging And the Internet", New York: Oct. 22, 1999. p. 1.*
Walker, Leslie, "Speak and you will find", The washington Post, dated Mar. 8, 2001.*
Tellme.com1, http://web.archive.org/web/20050913025239/http://www.tellme.com/about.html, dated Sep. 13, 2005.*
PCT/US2006/033602, Written Opinion of the International Search Authority mailed Aug. 31, 2007.
PCT/US2006/033602, International search report mailed Aug. 31, 2007.
PCT/US2006/033602, International Preliminary Report on Patentability Chapter I issued Mar. 4, 2008.

* cited by examiner

SYSTEM AND METHOD OF EVENT TRIGGERED VOICE CALL ORIGINATION

FIELD OF THE DISCLOSURE

The present disclosure relates to event triggered communications.

BACKGROUND

As of May 2005, the Cellular Telecommunications Industry Association (CTIA) estimates that there are 182 million wireless subscribers in the United States. Further, the CTIA estimates that over 2.5 billion text messages are sent every month. Text messages, sent via short messaging service (SMS), are currently used by Internet companies to deliver notifications to mobile telephones. Unfortunately, text messaging is not secure, does not provide guaranteed delivery, is not free, and is not sent in real-time.

Regarding security issues, programs have been provided that can enable someone to spoof a sender's SMS address. Further, since SMS messages are "store and forward" based systems, there is no guarantee that sent SMS messages are received within any particular timeframe. As such, some SMS providers present a disclaimer to their users that the provider is not responsible for messages that are lost or significantly delayed due to transmission via the Internet. Also, unlike voice calling plans, there currently are no "nights and weekends free" service plans for SMS messaging.

For certain e-commerce websites, e.g., on-line auction sites, text messaging is not a very efficient way to interact with bidders of items because the auctions are typically fast paced and require confirmed delivery of bids. Further, the auction sites may utilize instant feedback for usability and understanding of the system.

Accordingly, there is a need for an improved system and method of communicating with e-commerce websites, e.g., auction websites.

DETAILED DESCRIPTION OF THE DRAWINGS

A method of selective call initiation is disclosed and includes receiving data from a computer based auction site. Further, the method includes detecting a notification event by evaluating the data with respect to notification criteria associated with a user account. Also, the method includes initiating a voice based call over a voice network to a communication device identified in connection with the user account.

Additionally, a system is disclosed and includes a first processing element that is coupled to a network interface to receive data from a computer based auction site. Also, the system includes a second processing element to detect a notification event by evaluating the data with respect to notification criteria associated with a user account. Moreover, the system includes a third processing element to initiate an outgoing voice based call over a voice network to a communication device identified in connection with the user account.

Figure 1:
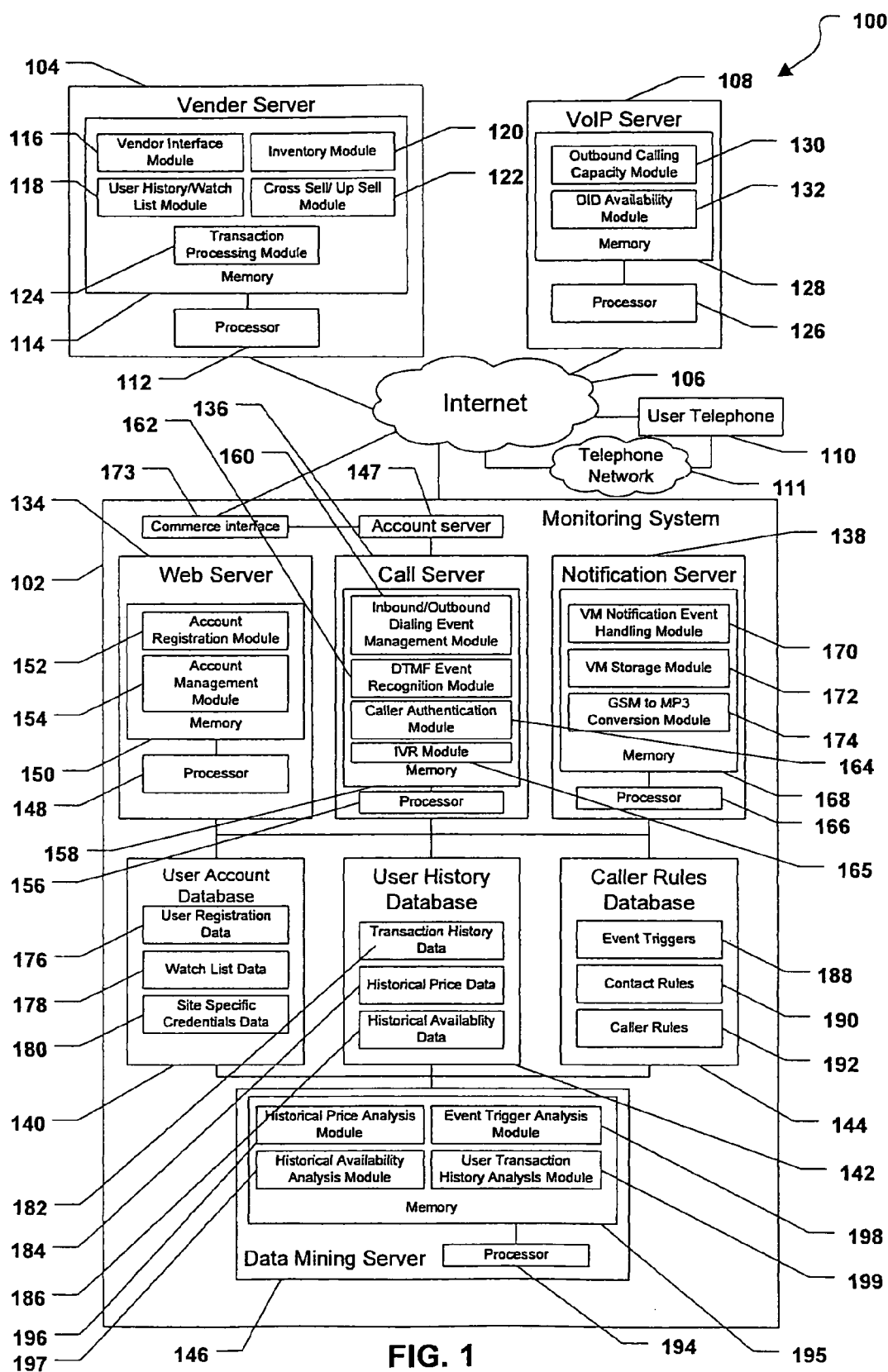
FIG. 1 is a block diagram representing a system of facilitating e-commerce.

Referring to FIG. 1, a system of facilitating e-commerce is shown and is designated 100. As shown, the system 100 includes a monitoring system 102 that communicates with a vender server 104 via the Internet 106. Further, the monitoring system 102 communicates with a voice over Internet protocol (VoIP) server 108 via the network 106. In a particular embodiment, a user telephone 110 is coupled to the monitoring system 102 via the Internet 106. Further, the user telephone 110 can be coupled to the Internet 106 via a telephone network 111, e.g., a public switched telephone network (PSTN) or a wireless telephone network, such as global system for mobile communication (GSM) network.

In a particular embodiment, the vender server 104 can be an e-commerce server that offers goods for sale with fixed pricing or escalating pricing based on an auction format. As shown, the vender server 104 can include a processor 112 and a memory 114 coupled to the processor 112. In a particular embodiment, one or more software applications or modules may be embedded within the memory 114 of the vender server 104. For example, the vender server 104 can include a vender interface module 116 embedded within the memory 114. The vender interface module 116 can provide connectivity with the vender server 104, e.g., via the Internet 106. In an illustrative embodiment, the vender server 104 also includes a user history/watch list module 118 than can be used to track the shopping or bidding history of one or more users and items that one or more user are seeking to purchase.

As shown in FIG. 1, the vender server 104 can further include an inventory module 120 that can be used to track the inventory provided for sale via the vender server 104. Further, the vender server 104 can include a cross sell/up sell module 122 that can be used to increase the sales provided by the vender server 104. For example, when a user purchases a particular item, the cross sell/up sell module 122 can recognize related items that may be useful to the user and offer those related items to the user for sale in conjunction with a purchased item. FIG. 1 also shows that the vender server 104 can include a transaction processing module 124 for processing transactions with the vender server 104.

As depicted in FIG. 1, the VoIP server 108 can include a processor 126 and a memory 128 that is accessible to the processor 126. In a particular embodiment, one or more software applications or modules may be embedded within the memory 128 of the VoIP server 108. For example, as shown, an outbound calling capacity module 130 can be embedded within the memory. In a particular embodiment, the outbound calling capacity module 130 can determine the number of outbound calls that the VoIP server 108 is capable of establishing at any given time. FIG. 1 also indicates that the VoIP server 108 can include a direct inward dialing (DID) availability module 132 that is embedded within the memory 128 of the VoIP server 108. In an illustrative embodiment, the DID availability module 132 can determine whether direct inward dialing is available for a particular user and if so, a DID service can be use to identify a called party, e.g., by using DTMF or other signaling means, before connecting a call to a called party.

FIG. 1 illustrates that the monitoring system 102 includes a web server 134, a call server 136, and a voice mail notification server 138. Additionally, the monitoring system 102 includes a user account database 140, a user history database 142, and a caller rules database 144. Each of the databases 140, 142, 144 can be coupled to one or more of the servers 134, 136, 138 within the monitoring system 102. FIG. 1 also indicates that the monitoring system 102 can includes a data mining server 146 that can be coupled to the databases 140, 142, 144. Additionally, an account server 147 can be coupled to the call server 136.

In a non-limiting, exemplary embodiment, the web server 134 includes a processor 148 and a computer readable medium, e.g., a memory 150, that is accessible to the processor 148. In a particular embodiment, one or more software applications or modules may be embedded within the memory 150 of the web server 134. For example, an account registration module 152 and an account management module 154 can be embedded within the memory 150 of the web server 134. In a particular embodiment, the modules 152, 154 can be used to allow one or more users to establish user accounts with the monitoring system 102. Further, the modules 152, 154 can be used to allow users to configure multiple user accounts on a per-vender basis and configure one or more notification events, or trigger events, on a per-vender basis.

Additionally, in a particular embodiment, the modules 152, 154 can be used to allow one or more users to update contact information, or notification information, previously input to the monitoring system. The contact information can include alternate numbers at which a user can be reached, e.g., a home telephone number, a work telephone number, and a mobile telephone number. Also, in a particular embodiment, the modules 152, 154 can allow users to configure call security settings for the user accounts, e.g., the modules 152, 154 can allow each user to establish a personal identification number (PIN) with the system and each user can be prompted to input a PIN when contacted by the monitoring system 102.

As illustrated in FIG. 1, the call server 136 within the monitoring system 102 can include a processor 156 and a computer readable medium, e.g., a memory 158, that is accessible to the processor 156. In a particular embodiment, one or more software applications or modules may be embedded within the memory 158 of the call server 136. For example, an inbound/outbound dialing event management module 160 may be embedded within the memory 158. Also, a DTMF event recognition module 162 may be embedded within the memory 158. Further, a caller authentication module 164 may be embedded within the memory 158. FIG. 1 also shows that an interactive voice response (IVR) module 165 can be embedded within the memory 158. 20. In an alternative embodiment, the caller authentication module may be part of a third party identification verification system.

In a particular embodiment, the inbound/outbound dialing event management module 160 within the call server 136 can operate in order to establish calls to users when notification events are detected. Further, the DTMF event recognition module 162 can be used to handle DTMF recognition of input received from a user device, e.g., a telephone with touch-tone capabilities. Moreover, the caller authentication module 164 can interact with other components within the monitoring system, e.g., the user account database 140, in order to provide security validation such as telephone number verification or PIN verification. Additionally, the modules 160, 162, 164 within the call server 136 can operate with other components within the monitoring system 102 in order to handle one or more user sessions at the vender websites.

As depicted in FIG. 1, the voice mail notification server 138 can include a processor 166 and a computer readable medium, e.g., a memory 168, that is accessible to the processor 166. In a particular embodiment, one or more software applications or modules may be embedded within the memory 168 of the voice mail notification server 138. For example, a voice mail notification event handling module 170 can be embedded within the memory 168. Moreover, a voice mail storage module 172 can be embedded within the memory 168. A GSM to MPEG layer-3 (MP3) conversion module 174 can also be embedded within the memory 168.

In a particular embodiment, the voice mail notification event handling module 170 handles the distribution of non-live audio notifications, e.g., to voice mail systems. Further, the GSM to MP3 conversion module 174 can be used to convert GSM audio files to MP3 audio files. Additionally, the voice mail storage module 172 can be used to store various audio notifications that can be broadcast to users that are registered with the monitoring system 102.

In an exemplary, non-limiting embodiment, the account server 147 interacts with the call server 136 and a commerce interface 173. In a particular embodiment, the account server 147 can act as a "virtual user" for the vender websites when a registered user has been authenticated by the call server 136. Further, the account server 147 receives DTMF inputs, e.g., from a user via the call server 136, and translates the DTMF inputs to outbound Web events on a per vendor basis. For example, a user may press a "1" at a keypad of the user telephone and the account server can translate that response to an instruction to an auction website to increase a bid by one increment. Additionally, the account server 147 receives inputs from the vender websites and translates the inputs into audible phone events. Also, the account server 147 can translate the inputs into audible menus that can be broadcast to a registered user.

The commerce interface 173 may be implemented as an application programming interface (API) that can interact with the account server 147 and the vender interface module 116 at the vender server 104 in order to receive data representative of purchasing events and bidding events.

As illustrated in FIG. 1, the user account database 140 can include user registration data 176, watch list data 178, and site specific credentials 180. Also, as shown in FIG. 1, the user history database 142 can include transaction history data 182, historical price data 184, and historical availability data 186. The caller rules database 144 can include one or more event triggers 188, i.e., notification events. For example, the notification events can include the offer for sale of a particular item at a particular vendor website at a target price or the imminent end of an auction for a sought after item that a user has placed a bid.

In a particular embodiment, the caller rules database 144 can also include one or more contact rules 190 and one or more caller rules 192. The contact rules 190 can indicate the manner in which a registered user is to be contacted and a user defined order of calling a plurality of different contact numbers for the user. Further, the caller rules 192 can include user defined rules that will always control the action of the monitoring system when acting as a "virtual user." For example, when a particular item is offered for sale, the user can specify for the monitoring system to automatically purchase the item at the asking price. Thereafter, the monitoring system can contact the user to indicate that the item has been purchased. In an alternative embodiment, the data provided by the databases 140, 142, 144 can be stored in a single database that is accessible to one or more of the other components within the monitoring system 102.

Each of the servers described above is a processing element that can be a server, as described, or a process. Further, any number or combination of the modules described above can be stored and executed within a single processing element or multiple processing elements in communication with each other.

Figure 2:
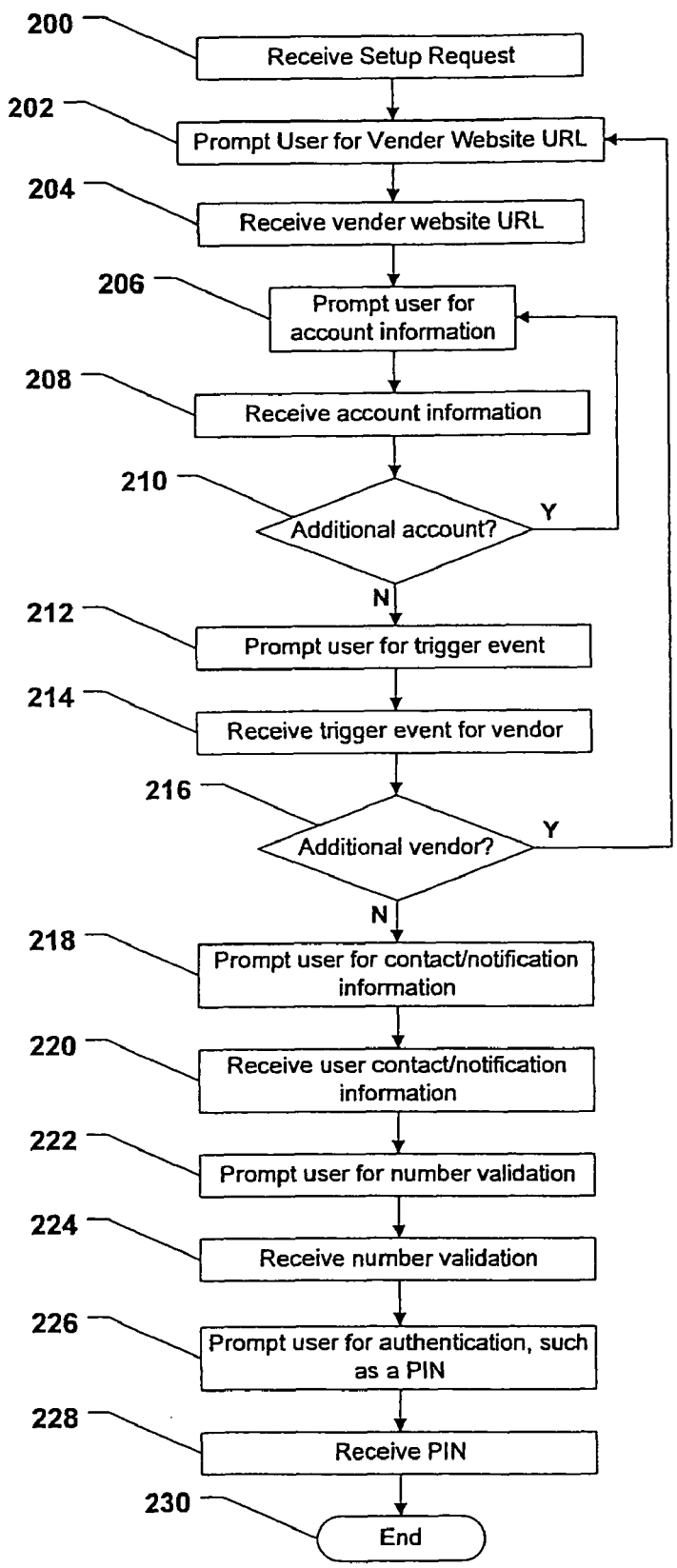
FIG. 2 is a flow chart illustrating a method of establishing a user account with a vender website monitoring system.

Referring to FIG. 2, a method of configuring a user account at the monitoring system is shown and commences at block

200. At block 200, the monitoring system receives a set up request from a user. At block 202, the user is prompted for a vendor website (URL). Moving to block 204, the monitoring system receives the vendor website URL from the user.

At block 206, the monitoring system prompts the user for account information, e.g., information concerning the user account with the vendor website. In a particular embodiment, the user account information can include a user account name, a user account number, and a user password. Moving to block 208, the system receives the user account information. Thereafter, at decision step 210, the system prompts the user to determine whether the user has an additional account with the vendor website. If so, the method returns to block 206 and continues as described.

If the user does not have an additional account with the vendor website, the method proceeds to block 212 and the user is prompted for a trigger event. In a particular embodiment, the trigger event can be a particular online auction for a particular item. Further, in a particular embodiment, the trigger event can be the release of a particular item, e.g., concert tickets, at a vendor website. Further, the trigger event can be a price decrease of a particular item, the release of a new book, the release of a new compact disk, etc. At block 214, the system receives the trigger event for the vendor.

Continuing to decision step 216, the system prompts the user to determine whether the user wishes to set up an account with another vendor. If the user indicates that the user would like to set up an account with another vendor, the method returns to block 202 and continues as described. If the user indicates that the user does not want to set up an account with another vendor, the method proceeds to block 218 and the system prompts the user for contact information or notification information. In a particular embodiment, the contact information or notification information can include a telephone number, e.g., a cellular telephone number, a mobile telephone number, or a public switched telephone network (PSTN) telephone number. At block 220, the system receives the user contact information or notification information.

Proceeding to block 222, the system prompts the user for number validation. At block 224, the system receives the number validation from the user. Next, at block 226, the system can prompt the user for an authentication, e.g., a personal identification number (PIN), that can be associated with the user account at the monitoring system. At block 228, the system receives the PIN from the user. The method then ends at state 230. Accordingly, the method described above can be used by a user to register with the monitoring system. Further, based on the information input to the monitoring system the user can be alerted when any of the trigger events input to the monitoring system occur at one or more vendor websites.

Figure 3:
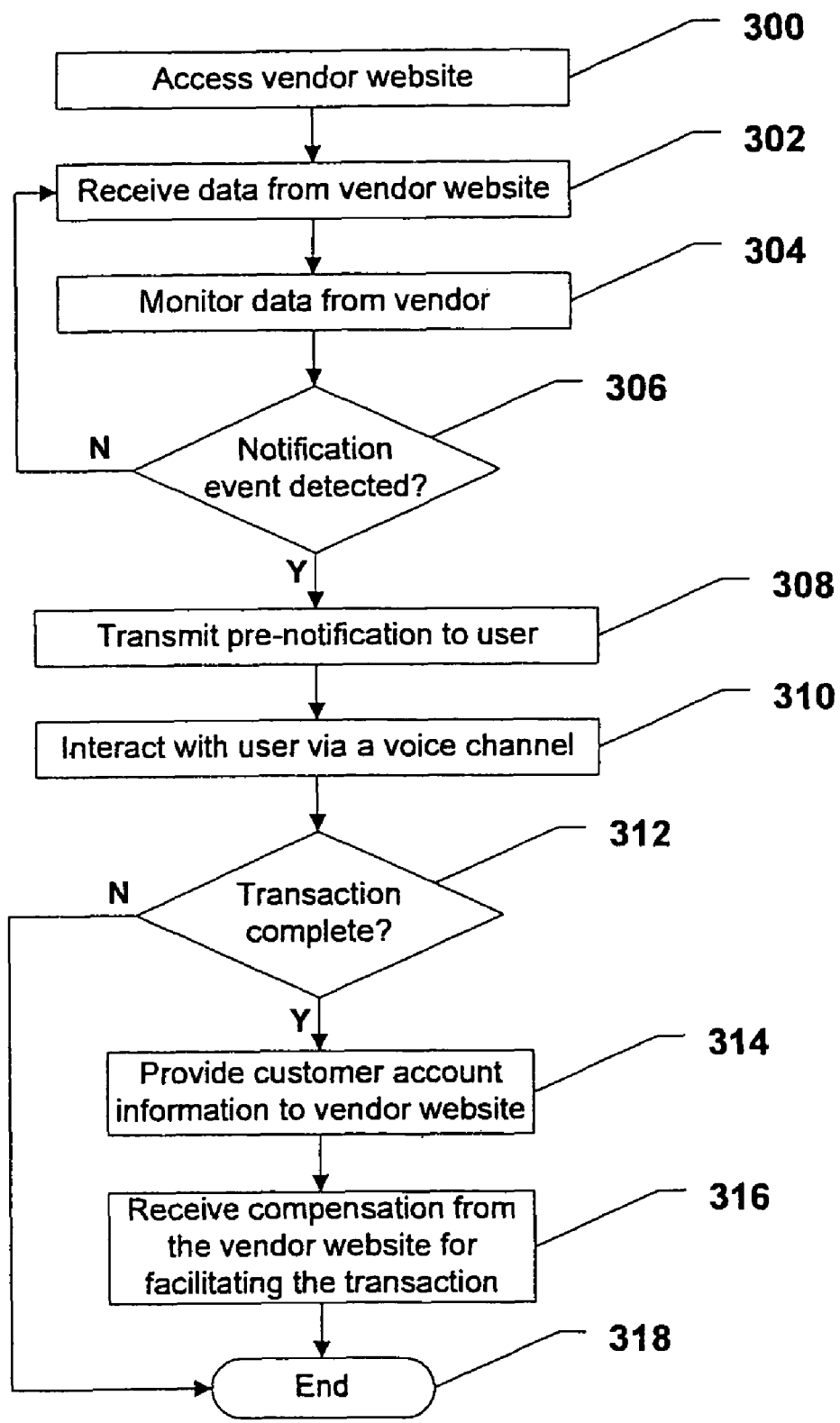
FIG. 3 is a flow chart illustrating a general method of monitoring a vender website.

Referring to FIG. 3, a method of monitoring a vendor website for a trigger event is shown. Beginning at block 300, the monitoring system accesses the vendor website, e.g., via the Internet. At block 302, the monitoring system receives data from the vendor website. Next, at block 304, the monitoring system monitors the data from the vendor website. Moving to decision step 306, the monitoring system determines whether a notification event is detected based on the data received from the vendor website. If a notification event is not detected, the method returns to block 302 and continues as described herein. In a particular embodiment, the monitoring system can detect a notification event by monitoring the data received from the vender website for one or more of the triggers input by the user, e.g., a imminent end of an auction and a price decrease of a product.

On the other hand, if a notification event is detected, the method proceeds to block 308 and the monitoring system transmits a pre-notification message to the user. Next, at block 310 the monitoring system interacts with a user via a voice channel. In a particular embodiment, the pre-notification message can be sent to the user a predetermined time before the interaction with the user, e.g., thirty minutes prior to the interaction. Additionally, the pre-notification message can be sent to the user via a short messaging system (SMS), an email system, or an alphanumeric paging system. Also, in a particular embodiment, the pre-notification message can include the exact time that the interaction with the user is scheduled, the subject of the interaction, and other relevant information, e.g., a bid status, an auction status, a time remaining for the auction, etc. Further, in an exemplary, non-limiting embodiment, the interaction with the user can be facilitated using an interactive voice response (IVR) module at the monitoring system.

Figure 4:
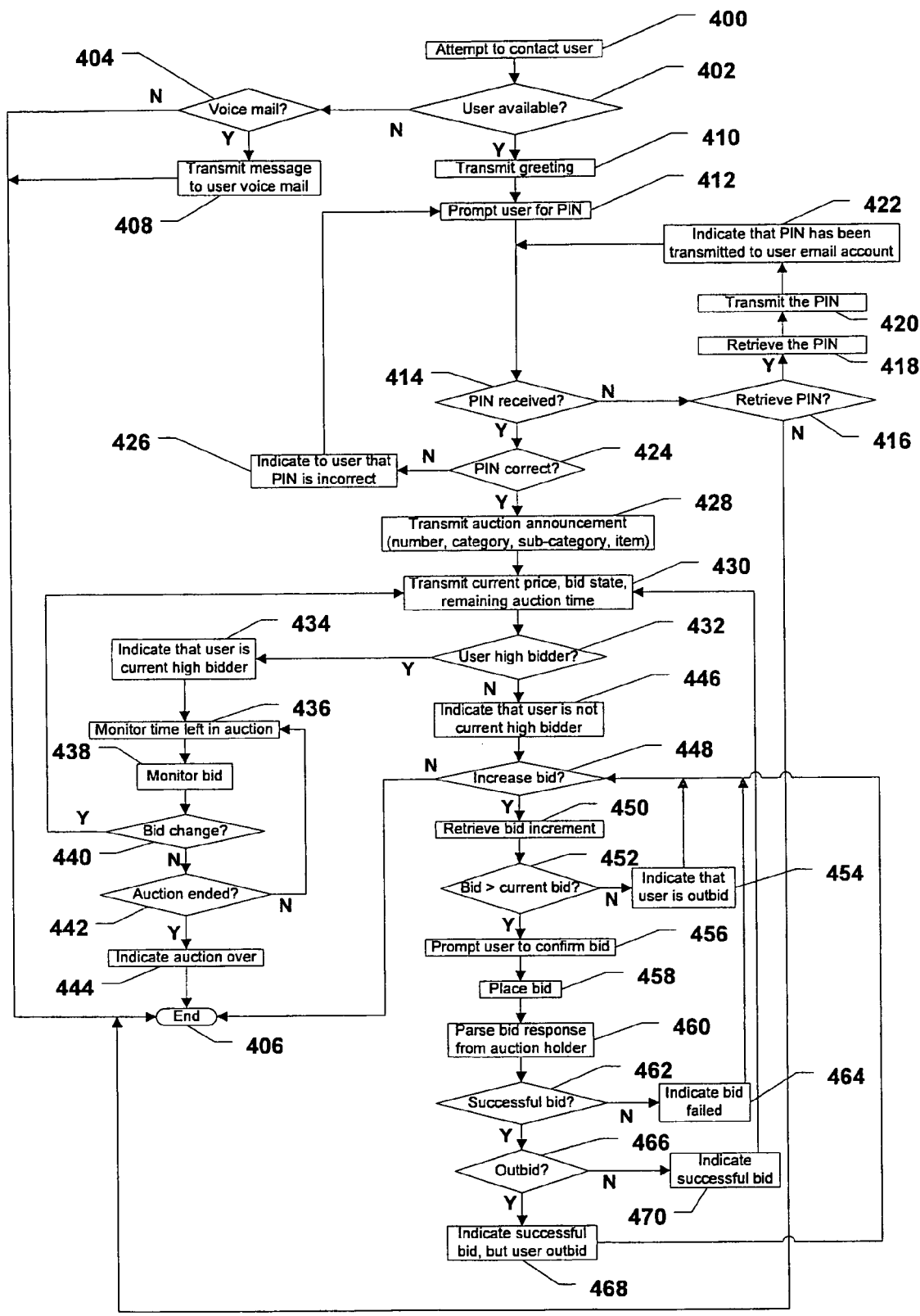
FIG. 4 is a flow chart illustrating a detailed method of contacting a registered user about an auction website.
Figure 5:
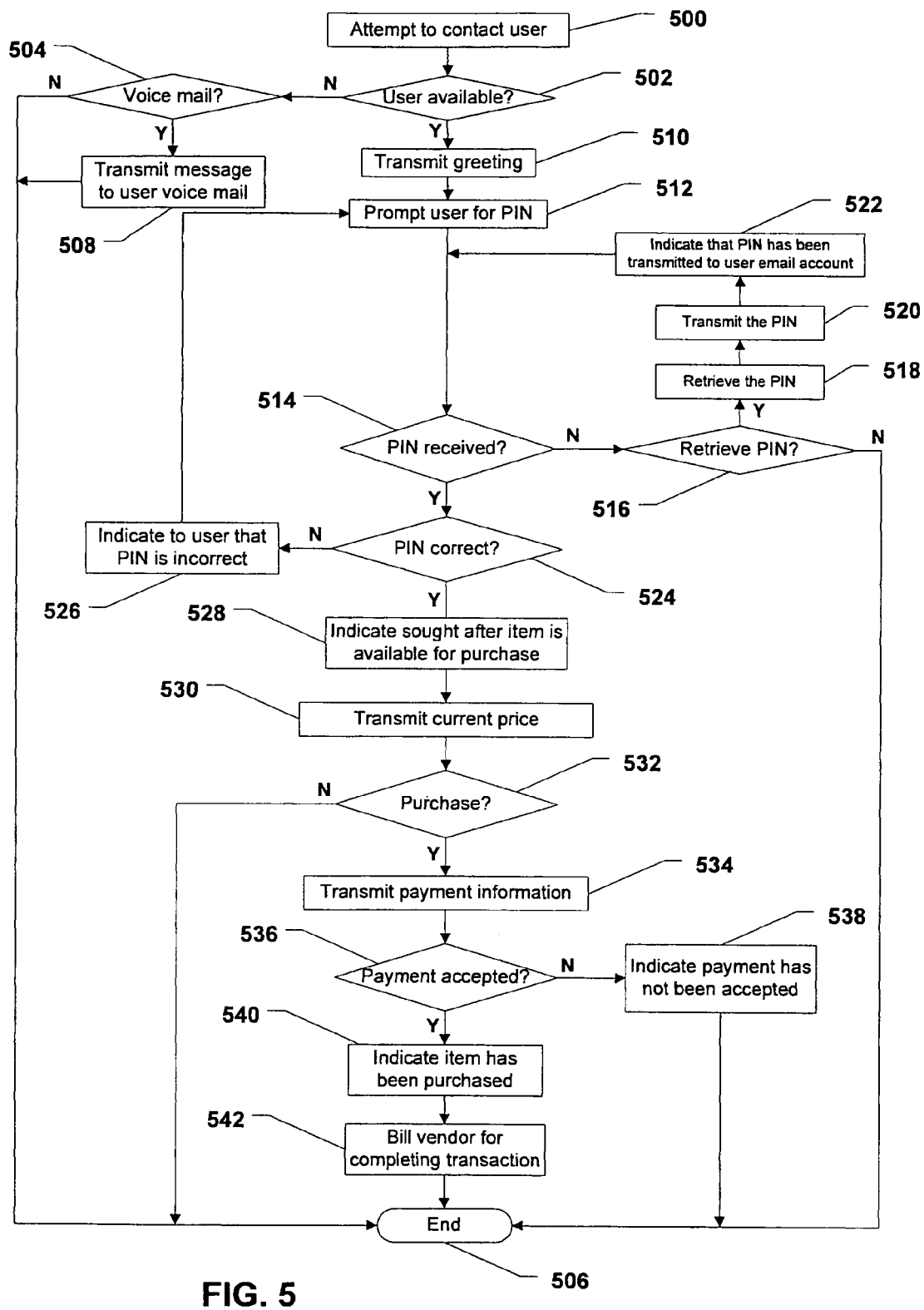
FIG. 5 is a flow chart illustrating a detailed method of contacting a registered user about an e-commerce website.

FIG. 4 depicts an exemplary method of interacting with a user that is registered with an auction website. FIG. 5 depicts an exemplary method of interacting with a user that is registered with an e-commerce website offering products for sale at set pricing.

Returning to FIG. 3, at decision step 312, the monitoring system determines whether the transaction has been completed, e.g., whether the user has purchased an item associated with the notification event or whether an auction associated with the notification event has ended. If the transaction is completed, the method proceeds to block 314 and the monitoring system provides customer account information to the vendor website. In a particular embodiment, the account information can include a login identification and a password. Further, in a particular embodiment, the account information can include an affiliate identification, which can be used to track successful bids and successful transactions. In another embodiment, the account information can include billing information, e.g., an account number, a credit card number, etc.

At block 316, the monitoring system receives compensation from the vendor website for facilitating the transaction. The method then ends at state 318. In a particular embodiment, the monitoring system can be compensated via an affiliate program associated with the vendor website. For example, an affiliate program identification can be tracked and the monitoring system can be credited for transactions. Additionally, in a particular embodiment, a transaction may include a completed purchase of an item. Alternatively, a transaction may include a successful bid for an item at an auction website. Returning to decision step 312, if the transaction is not completed, e.g., the user has decided not to purchase the item associated with the notification event, the method ends at state 318.

In a particular embodiment, the monitoring system can monitor the number of successful transactions and determine the rate at which successful transactions occur. As such, the monitoring system can further target particular users that are prone to completing transactions and purchasing goods. Further, the monitoring system can determine the percentage of total calls established that result in completed transactions that may be subject to billing to a vendor website. Alternatively, the monitoring system can determine the percentage of total calls that are compensated calls where the vendor website pays compensation either directly or through an affiliated payment plan in connection with user action made during the calls. In a particular embodiment, during operation, the percentage of total calls billed to one or more vendor websites is above a targeted percentage, e.g., ten percent, twenty percent, and fifty percent. The percentage of calls billed can be used to modify the monitoring system. For example, if the percentage of calls billed falls below the targeted percentage the monitoring system can modify the number of users that are called. Alternatively, the monitoring system can review the historical data for each user and only target those users that have a history of completing transactions via the monitoring system.

Referring to FIG. 4, a method of contacting a registered user regarding an auction website event is shown and commences at block 400. At block 400, the monitoring system attempts to contact a registered user over a voice channel, such as a cellular telephone. Next, at decision step 402, the monitoring system determines whether the user is available, i.e., has the user answered the telephone. If the user is not available, the method proceeds to decision step 404 and the monitoring system determines whether a voice mail system answers the call from the monitoring system. If not, the method ends at state 406. Otherwise, if a voice mail system answers the call from the monitoring system, the method continues to block 408 and the monitoring system transmits an audio message, e.g., an MP3 message, to the user voice mail. The method then ends at state 406.

Returning to decision step 402, when the user is available, the method proceeds to block 410 and the monitoring system transmits an audio greeting to the user 410. Thereafter, at step 412, the monitoring system prompts the user for a PIN in order to verify the user's identity. Proceeding to decision step 414, the monitoring system determines whether a PIN is received.

When a PIN is not received, the monitoring system prompts the user to determine whether the user would like the monitoring system to retrieve the PIN. If the user indicates that the user does not want the monitoring system to retrieve the PIN, the method ends at state 406. Conversely, when the user indicates to the monitoring system that the user does want the monitoring system to retrieve the PIN, the method proceeds to block 418 and the monitoring system retrieves the user PIN. Next, at block 420, the monitoring system transmits the user PIN to the user email account. At block 422, the monitoring system indicates that the PIN has been transmitted to the user email account.

Returning to decision step 414, when a PIN is received from the user, the method proceeds to decision step 424 and the monitoring system determines whether the PIN is correct. If the PIN is incorrect, the method moves to block 426 and the monitoring system indicates to the user that the PIN is incorrect. The method then returns to block 412 and continues as described herein.

When a correct PIN is received at decision step 424, the method continues to block 428 and the monitoring system transmits an auction announcement to the user, e.g., by transmitting an audio message to the user. In a particular embodiment, the auction announcement can include the number of the auction, the category of the auction, the sub-category of the auction, and the name of the item. Thereafter, at block 430, the monitoring system transmits the current price of the item, the current bid state, and the remaining auction time to the user. In a particular embodiment, the monitoring system can contact the user when the remaining auction time is less than ten minutes, e.g., six minutes, three minutes, etc. Further, in an alternative embodiment, a time remaining for the auction can be transmitted to the user in response to the user inputting a request for the time remaining, e.g., using a keypad at a telephone. In another alternative embodiment, the time remaining can be dynamically injected into a phone session in order to give real-time updates concerning the time remaining for the auction or a quantity remaining for a particular item.

Moving to decision step 432, the monitoring website determines whether the user is the high bidder. If the user is the high bidder, the method continues to block 434 and the monitoring system indicates to the user that the user is the high bidder. At block 436, the monitoring system monitors the time remaining in the auction. Next, at block 438, the monitoring system monitors the bid. Proceeding to decision step 440, the monitoring system determines whether the bid has changed. If the bid changes, the method returns to block 430 and continues as described.

On the other hand, if the bid has not changed, the method moves to decision step 442 and the monitoring system determines whether the auction has ended. If the auction has not ended, the method returns to block 436 and continues as described herein. When the auction ends, the method moves to block 444 and the monitoring system indicates that the auction has ended. The method then ends at state 406.

Returning to decision step 432, if the user is not the high bidder, the method proceeds to block 446 and the monitoring system indicates that the user is not the high bidder. Next, at decision step 448, the monitoring system prompts the user to determine whether the user would like to increase his or her bid. If the user does not want to increase the bid, the method ends at state 406. When the user wants to increase the bid, the method moves to block 450 and the monitoring system retrieves the bid increment from the auction website. In a particular embodiment, the monitoring system can increase the user's bid to the user's maximum bid.

In a particular embodiment, the monitoring system determines real-time state information, such as high-bid status, through interaction with the auction website. For example, the time remaining for an auction can be managed at the auction website and the monitoring system can periodically poll the auction website in order to determine the time remaining.

Proceeding to decision step 452, the monitoring system determines whether the user's bid is greater than the current bid. If the user's bid is not greater than the current bid, the method proceeds to block 454 and the monitoring system indicates that the user is still outbid. The method returns to decision step 448 and continues as described. At decision step 452, when the user's bid is greater than the current bid, the method moves to block 456 and the monitoring system prompts the user to confirm the bid. Next, at block 458, the monitoring system places the bid for the user.

Continuing to block 460, the monitoring system parses a bid response received from the auction website. At decision step 462, the monitoring system determines whether the user's bid is successful. If the user's bid is not successful, the method proceeds to block 464 and the monitoring system indicates that the user's bid has failed. The method then returns to decision step 448 and continues as described herein.

At decision step 462, if the user's bid is successful, the method proceeds to decision step 466 and the monitoring system determines whether the user has been outbid. If the user is outbid, the method proceeds to block 468 and the monitoring system indicates to the user that the bid is successful, but the user has been outbid. The method then returns to decision step 448 and continues as described. Conversely, if the user is not outbid, the method proceeds to block 470 and the monitoring system indicates to the user that the user's bid was successful. Then, the method returns to block 430 and continues as described.

Referring to FIG. 5, a method of contacting a registered user about an e-commerce website is shown and commences at block 500. At block 500, the monitoring system attempts to contact a registered user via a telephone, e.g., a cellular telephone or a landline telephone. Next, at decision step 502, the monitoring system determines whether the user is available, i.e., has the user answered the call. If the user is not available, the method proceeds to decision step 504 and the monitoring system determines whether a voice mail system answers the call from the monitoring system. If not, the method ends at state 506. Otherwise, if a voice mail system answers the call from the monitoring system, the method continues to block 508 and the monitoring system transmits an audio message, e.g., an MP3 message, to the user voice mail. The method then ends at state 506.

Returning to decision step 502, when the user is available, the method proceeds to block 510 and the monitoring system transmits an audio greeting to the user 510. Thereafter, at step 512, the monitoring system prompts the user for a PIN in order to verify the user's identity. Proceeding to decision step 514, the monitoring system determines whether a PIN is received.

When a PIN is not received, the monitoring system prompts the user to determine whether the user would like the monitoring system to retrieve the PIN. If the user indicates that the user does not want the monitoring system to retrieve the PIN, the method ends at state 506. Conversely, when the user indicates to the monitoring system that the user does want the monitoring system to retrieve the PIN, the method proceeds to block 518 and the monitoring system retrieves the user PIN. Next, at block 520, the monitoring system transmits the user PIN to the user email account. At block 522, the monitoring system indicates that the PIN has been transmitted to the user email account.

Returning to decision step 514, when a PIN is received from the user, the method proceeds to decision step 524 and the monitoring system determines whether the PIN is correct. If the PIN is incorrect, the method moves to block 526 and the monitoring system indicates to the user that the PIN is incorrect. The method then returns to block 512 and continues as described.

When a correct PIN is received at decision step 524, the method continues to block 528 and the monitoring system indicates that a sought after item, e.g., an item on a watch list or wish list established by the user with the monitoring system or the vendor website, is available for purchase or is at a target price desired by the user. Next, at block 530, the monitoring system transmits a current price to the user. In a particular embodiment, the monitoring system communicates with the user by transmitting audio messages to the user. Moving to decision step 532, the monitoring system prompts the user in order to determine whether the user wants to purchase the sought after item. If the user does not want to purchase the sought after item, the method ends at state 506.

On the other hand, if the user indicates that the user wants to purchase the sought after item, the method proceeds to block 534 and the monitoring system transmits the user payment information, previously supplied to the monitoring system, to the vender website. Thereafter, at block 536, the monitoring system determines whether payment has been accepted by the vendor website. If payment is not accepted, the method proceeds to block 538 and the monitoring system indicates to the user that payment has not been accepted by the vendor website. The method then ends at state 506. In a particular embodiment, payment can be facilitated using previously stored payment data, e.g., using a "one click" shopping mechanism at the vendor website.

When payment is accepted, the method proceeds to block 540 and the monitoring system indicates to the user that the sought after item has been purchased. Proceeding to block 542, the monitoring system bills the vendor website for completing the transaction. The method then ends at state 506.

In one or more of the methods disclosed, a user is authenticated by inputting a PIN. However, the user can input one or more alternative authentication inputs. For example, the authentication input can be a biometric input, such as a voice input, a fingerprint scan, a palm scan, an iris scan, a retinal scan, facial mapping, infrared pattern matching, etc. Alternatively, the authentication can be performed using a physical token device, e.g., a passkey or a universal serial bus (USB) dongle.

With the configuration of structure described above, the system and method of event triggered voice call origination provides a way to monitor auction websites and e-commerce websites and facilitate transactions with those websites. For each completed transaction, the system can bill the websites for a referral fee. The system and method described above can login into the vendor websites with account credentials provided by users. In a particular embodiment, the vendor websites can provide access to their systems via merchant level APIs. In another embodiment, the system can create proxy sessions for each user at the vendor website and act as a "virtual user" at the vendor website.

Once an account is established with the monitoring system, the user can associate the account with one or more vendor accounts that the user wants to monitor. Thereafter, a user can establish a notification profile that can include one or more contact telephone numbers, a PIN number for authenticating communication with the user, and one or more rules that can control how the user would like to make future bid and/or purchase decisions. For example, the system can allow users to buy items or bid on items in real time. Alternatively, the system can email details of a transaction to the user for confirmation and final purchase authorization.

Further, in an illustrative embodiment, a user can configure the type of notification events that the user would like to receive. The notification events can be linked to triggers which can also be configured by the user. Exemplary triggers can include: outbid notification, auction closing notification, back order availability, price decrease notification, etc. In a particular embodiment, the price decrease notification can be based on a target percentage amount decrease or a target dollar amount decrease.

The monitoring system described herein can periodically access a particular user profile, connect with one or more vendors associated with the profile, and pull information concerning the user from the vendor. The update process can be triggered, i.e., the system may know that an auction in which the user is bidding may be ending within a particular time frame, and the system can connect to the vendor to update the information after the trigger occurs. Data that is retrieved during the updates can be stored in a user history and analyzed for product availability trends, pricing trends, bidding trends, etc. Further, based on the analysis of the data, the system can determine that user notification is necessary.

If notification is necessary, the system accesses one or more caller/contact rules and contacts the user based on a primary means of contact, e.g., a cellular telephone number, a home telephone number, or a work telephone number. A caller identification presented to the user when the system dials the user can identify the call as being time sensitive form the monitoring system. Moreover, when a user answers a call from the monitoring system, the user can be greeted and prompted for the user's PIN. A correct PIN authenticates the user and provides the user with access to the system to make bids and/or purchases based on the user account.

In a particular embodiment, the monitoring system can triggers calls when the data available to the system indicates that, historically, the user would want to receive a call and take action based on the trigger event. Caller identification information can be presented to the user to let the user know why the monitoring system is calling the user. Particular numbers can be associated with particular vendors. If the user cannot recall the PIN associated with the account, the user can input a request to the system to send the PIN to an email account associated with the user account. Alternatively, the user may be connected to a customer service representative and receive the PIN after authenticating the identity of the user, e.g., by inputting personal information and answering a series of secret questions.

In a particular embodiment, the purpose of the call, or the context of the call, is established relatively quickly in order to reduce the costs associated with establishing the call. The system can us a combination of pre-recorded auction files and dynamically generated text-to-speech audio to prompt the user about the item or opportunity about which the system is calling the user. For example, when bidding on an item at an auction website, the system can quickly convey to the user an auction title, a bid status, a starting bid, a current price and a time left in the auction. Additionally, the user may desire to receive other auction specific information that can presented via a menu or sub-menu. The additional information can include a seller name, a seller feedback rating, a buy-not-status or availability, a number of bids in auction, an item location, a cost of shipping, and additional text content form the body of the auction.

For non-auction transactions, the system can identify the opportunity, identify the trigger event that resulted in the call, and allow the user to request additional information via a voice response menu.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of selective call initiation at a monitoring system comprising one or more processors, the method comprising:
    receiving data related to an auction from a computer based auction site at the monitoring system;
    detecting a notification event by evaluating the data with respect to notification criteria associated with a user account using the one or more processors;
    sending a pre-notification message to a user, wherein the pre-notification message specifies a time that an interaction with the user is scheduled, a subject of the interaction, a bid status, an auction status and a time remaining for the auction, and wherein the pre-notification message is one of a short messaging system (SMS) message, an email message and an alphanumeric paging message; and
    initiating, at the time specified in the pre-notification message, a voice based call over a voice network to a communication device identified in connection with the user account using the one or more processors, wherein the voice based call is initiated from a telephone number that is selected from a plurality of telephone numbers, wherein each telephone number of the plurality of telephone numbers is associated with one of a plurality of computer based auction sites, and wherein the selected telephone number is included in caller identification information that is communicated via the voice based call.

2. The method of claim 1, further comprising determining whether a transaction associated with the notification event is complete using the one or more processors.

3. The method of claim 2, further comprising providing account information associated with the user account to the computer based auction site using the one or more processors.

4. The method of claim 3, wherein the account information includes user identification data.

5. The method of claim 1, further comprising:
    configuring a plurality of user accounts associated with the user, each user account of the plurality of user accounts associated with a particular computer based auction site of the plurality of computer based auction sites;
    configuring one or more notification events associated with the plurality of computer based auction sites; and
    managing one or more user sessions at the plurality of computer based auction sites.

6. The method of claim 5, further comprising:
    receiving inputs from at least one of the plurality of computer based auction sites;
    translating the received inputs into at least one audible menu; and
    communicating the at least one audible menu to the user.

7. The method of claim 1, wherein the voice network provides a communication path that supports a voice notification and wherein the voice notification is provided by an interactive voice response module.

8. The method of claim 7, wherein the voice notification further includes a non-voice audio signal.

9. The method of claim 8, wherein the voice notification indicates an auction event associated with an auction item in which a user had previously placed a bid.

10. The method of claim 9, wherein the auction event indicates that a party other than the user has outbid the user with respect to the auction item.

11. The method of claim 9, wherein the auction event indicates the time remaining for the auction.

12. The method of claim 11, wherein the time remaining is less than ten minutes.

13. The method of claim 11, wherein the time remaining is less than six minutes.

14. The method of claim 13, wherein the time remaining is about three minutes.

15. The method of claim 1, wherein the notification criteria includes a set of rules associated with the user account.

16. The method of claim 1, further comprising receiving compensation from the computer based auction site for facilitating at least one completed transaction.

17. A system comprising:
    a first processing element coupled to a network interface to receive data from a computer based auction site;
    a second processing element to detect a notification event by evaluating the data with respect to notification criteria associated with a user account;
    a third processing element to initiate an outgoing voice based call over a voice network to a communication device identified in connection with the user account, wherein the outgoing voice based call is initiated from a telephone number that is selected from a plurality of telephone numbers, wherein each telephone number of the plurality of telephone numbers is associated with one of a plurality of computer based auction sites, wherein the third processing element communicates with a caller authentication module, and wherein the caller authentication module authenticates at least one user associated with the notification event; and a fourth processing element to receive compensation from the computer based auction site for facilitating at least one completed transaction.

18. The system of claim 17, wherein the authentication is performed based on a personal identification number received from the at least one user.

19. The system of claim 17, wherein the authentication is performed based on a biometric input received from the at least one user.

20. The system of claim 19, wherein the biometric input includes at least one of the following: a voice input, a fingerprint scan, a palm scan, an iris scan, a retinal scan, facial mapping, and infrared pattern matching.

21. The system of claim 17, wherein the authentication is performed using a physical token device.

22. The system of claim 21, wherein the physical token device is a passkey or a universal serial bus dongle.

23. The system of claim 17, wherein the caller authentication module is part of a third party identification verification system.

24. The system of claim 17, further comprising a caller rules database that includes data associated with contacting the at least one user.

25. The system of claim 17, wherein the network interface is coupled to a distributed computer network and wherein a call processing element is coupled to the voice network via the distributed computer network.

26. The system of claim 25, wherein the voice network includes a voice over internet protocol component and a wireless component.

27. The system of claim 26, wherein the voice over internet protocol component is accessible via the distributed computer network.

28. The system of claim 27, wherein the distributed computer network is the Internet.

29. A system comprising:
a first processing element coupled to a network interface to receive data from a computer based auction site, the data corresponding to a plurality of different auctions associated with a corresponding plurality of auction items;
a second processing element to detect notification events by evaluating the data with respect to notification criteria associated with user auction rules associated with a plurality of user accounts and to send a pre-notification message to at least one user, the pre-notification message specifying a time when the at least one user will be contacted;
a third processing element responsive to the second processing element to initiate, at the time specified in the pre-notification message, outgoing voice based calls over a voice network to communication devices identified in connection with specific user accounts, the outgoing voice based calls initiated in response to detected notification events, the outgoing voice based calls initiated from a telephone number that is selected from a plurality of telephone numbers, wherein each telephone number of the plurality of telephone numbers is associated with one of a plurality of computer based auction sites, wherein the third processing element communicates with a caller authentication module to authenticate the at least one user associated with the detected notification events; and a fourth processing element to receive compensation from the computer based auction site for facilitating at least one completed transaction.

30. The system of claim 29, wherein the first processing element comprises:
a processor;
a computer readable medium accessible to the processor; and
an account registration module embedded within the computer readable medium, wherein the account registration module is accessible to establish the plurality of user accounts.

31. The system of claim 30, wherein the first processing element further comprises an account management module embedded within the computer readable medium, wherein the account management module is accessible to manage the plurality of user accounts.

32. The system of claim 29, wherein the second processing element further comprises:
a processor;
a computer readable medium accessible to the processor; and
a dialing event management module embedded within the computer readable medium, wherein the dialing event management module establishes at least one telephone call with the at least one user associated with the detected notification events.

33. The system of claim 32, wherein the second processing element further comprises a dual tone multi-frequency (DTMF) event recognition module embedded within the computer readable medium, wherein the DTMF event recognition module decodes one or more DTMF inputs received at the second processing element from a user telephone associated with the at least one user.

34. The system of claim 29, wherein the third processing element comprises:
a processor;
a computer readable medium accessible to the processor; and
a notification event handling module embedded within the computer readable medium.

35. The system of claim 34, wherein the third processing element further comprises a storage module embedded within the computer readable medium, wherein the storage module stores a plurality of audio notifications associated with the plurality of user accounts.

36. The system of claim 29, further comprising a database in communication with at least one of the first processing element, the second processing element, and the third processing element, wherein the database includes at least one of user registration data, watch list data, site specific credentials data, transaction history data, historical price data, historical availability data, event trigger data, contact rules data, and caller rules data.

37. The system of claim 36, further comprising a data miner in communication with the database, wherein the data miner comprises:
a processor;
a computer readable medium accessible to the processor; and
a historical price analysis module embedded within the computer readable medium, wherein the historical price analysis module selectively analyzes the historic price data to determine one or more price trends.

38. The system of claim 37, wherein the data miner further comprises a historical availability analysis module, wherein the historical availability analysis module selectively analyzes the historic availability data to determine one or more availability trends.

39. The system of claim 38, wherein the data miner further comprises an event trigger analysis module, wherein the event trigger analysis module selectively analyzes the event trigger data to determine at least one of the following: one or more most received event triggers, one or more least received event triggers, one or more most successful event triggers, and one or more least successful event triggers.

40. The system of claim 39, wherein the data miner further comprises a user transaction history analysis module, wherein the user transaction history analysis module selectively analyzes transaction history data for at least one of the plurality of user accounts in order to determine at least one of the following: a number of completed transactions, a number of failed transactions, a number of pending transactions, and a number of billed transactions.

41. The system of 37, wherein the data miner interacts with the plurality of computer based auction sites to update the database.

42. A method of selective call initiation at a monitoring system comprising one or more processors, the method comprising:
receiving data including product availability data from an electronic commerce site of a plurality of electronic commerce sites at the monitoring system;
detecting a notification event using the one or more processors by evaluating the product availability data with respect to notification criteria associated with a user account;
sending a pre-notification message to a user, the pre-notification message specifying a time when the user will be contacted;
initiating, at the time specified in the pre-notification message, an outgoing voice based call over a voice network to a communication device identified in connection with the user account, wherein the outgoing voice based call is initiated from a telephone number that is selected from a plurality of telephone numbers, and wherein each telephone number of the plurality of telephone numbers is associated with one of the plurality of electronic commerce sites;
authenticating a user associated with the user account using the one or more processors; and
receiving compensation from the electronic commerce site or from an owner or operator thereof, for facilitating at least one completed transaction.

43. The method of claim 42, further comprising indicating to the user associated with the user account via the outgoing voice based call that a product associated with the product availability data is available for purchase.

44. The method of claim 43, further comprising transmitting a current price of the product via the outgoing voice based call.

45. The method of claim 44, wherein the product is a limited quantity product.

46. The method of claim 44, further comprising prompting the user to purchase the product using the one or more processors.

47. The method of claim 46, further comprising transmitting payment information to the electronic commerce website using the one or more processors.

48. A system comprising:
a first processing element coupled to a network interface to receive data including product availability data from an electronic commerce site of a plurality of electronic commerce sites;
a second processing element to detect a notification event by evaluating the data with respect to notification criteria associated with a user account and to send a pre-notification message to a user, the pre-notification message specifying a time when the user will be contacted;
a third processing element to initiate, at the time specified in the pre-notification message, an outgoing call over a voice network to a communication device identified in connection with the user account, wherein the outgoing call is initiated from a telephone number that is selected from a plurality of telephone numbers, wherein each telephone number of the plurality of telephone numbers is associated with one of the plurality of electronic commerce sites, and wherein the electronic commerce site pays compensation in connection with a user action made during one or more calls established by the third processing element; and
a fourth processing element to receive compensation from the electronic commerce site, or from an owner or operator thereof, for facilitating at least one completed transaction.

49. The system of claim 48, wherein the electronic commerce site pays compensation using an affiliate payment plan.

50. The system of claim 48, wherein a percentage of total calls established by the third processing element are compensated calls where the at least one electronic commerce site pays compensation.

51. The system of claim 50, wherein the percentage of compensated calls compared to total calls established by the third processing element is greater than a targeted percentage.

52. The system of claim 51, wherein the targeted percentage is selected from the group comprising: ten percent, twenty percent, and fifty percent.

53. A method of contacting a user regarding an auction website of a plurality of auction websites from a monitoring system comprising one or more processors, the method comprising:
detecting a notification event by evaluating received data with respect to notification criteria associated with a user account using the one or more processors;
initiating a voice call to the user over a voice carrier network, wherein the voice call is initiated from a telephone number that is selected from a plurality of telephone numbers, wherein each telephone number of the plurality of telephone numbers is associated with one of the plurality of auction websites;
transmitting an audio greeting;
receiving a personal identification number (PIN) from the user at the monitoring system;
authenticating the PIN using the one or more processors;
transmitting an audio auction announcement;
transmitting a current price;
indicating whether or not the user is a high bidder using the one or more processors; and
receiving compensation from the auction website, or from an owner or operator thereof, for facilitating at least one completed transaction.

54. The method of claim 53, further comprising transmitting a time remaining indicator via the voice call.

55. The method of claim 54, further comprising prompting the user to increase a bid using the one or more processors when the user is not the high bidder.

56. The method of claim 55, further comprising:
retrieving a bid increment from the auction website using the one or more processors when the user indicates to increase the bid; and
transmitting the bid increment to the user from the monitoring system.

57. The method of claim 56, further comprising communicating an increased bid to the auction website from the monitoring system.

58. The method of claim 57, further comprising receiving a response at the monitoring system from the auction website based on the increased bid.

59. The method of claim 58, further comprising indicating, using the one or more processors, whether the bid is successful and whether the user is outbid.

60. The method of claim 54, wherein the voice carrier network includes at least one of the following: a cellular telephone network, a mobile telephone network, a public switched telephone network, and a voice over internet protocol telephone network.

61. The method of claim 54, wherein the audio auction announcement includes at least one of the following: an auction number, a category, a sub-category, and an item name.

62. A method of contacting a user from a monitoring system to provide information related to a product available at an e-commerce website of a plurality of e-commerce websites, the monitoring system comprising one or more processors, the method comprising:
detecting a notification event by evaluating received data with respect to notification criteria associated with a user account using the one or more processors;
sending a pre-notification message to the user, the pre-notification message specifying a time when the user will be contacted;
initiating a voice call to the user, at the time specified in the pre-notification message, over a telephone network, wherein the voice call is initiated from a telephone number that is selected from a plurality of telephone numbers, wherein each telephone number of the plurality of telephone numbers is associated with one of the plurality of e-commerce websites;
transmitting an audio greeting to the user;
receiving an authentication input from the user at the monitoring system;
authenticating the user using the one or more processors based on the authentication input;
transmitting an audio announcement associated with an available product;
transmitting a current price of the available product; and
receiving compensation from the e-commerce website, or from an owner or operator thereof, for facilitating a completed transaction.

63. The method of claim 62, further comprising prompting the user from the monitoring system to determine whether the user wants to purchase the available product.

64. The method of claim 63, further comprising transmitting payment information to the e-commerce website from the monitoring system when the user indicates to purchase the available product.

65. The method of claim 64, wherein payment is made using an existing user-defined payment option at the e-commerce website.

66. The method of claim 65, wherein the existing user-defined payment option is a one click payment option.

67. The method of claim 64, further comprising indicating to the user that the available product is purchased using the one or more processors.

68. The method of claim 67, further comprising billing the e-commerce website for the completed transaction before receiving the compensation from the e-commerce website for facilitating the completed transaction.

69. The method of claim 67, further comprising receiving credit from the e-commerce website through an affiliate billing program.

70. The method of claim 62, wherein the telephone network includes at least one of a cellular telephone network, a mobile telephone network, a public switched telephone network, and a voice over Internet protocol telephone network.

* * * * *